July 3, 1951          A. A. LOCKE          2,559,444

EGG COOKER

Filed Nov. 23, 1945          3 Sheets-Sheet 1

INVENTOR
ARTHUR A. LOCKE
BY Raymond F. James
ATTORNEY

July 3, 1951   A. A. LOCKE   2,559,444
EGG COOKER

Filed Nov. 23, 1945   3 Sheets-Sheet 2

INVENTOR
ARTHUR A. LOCKE
BY Raymond Th. Hernes
ATTORNEY

July 3, 1951      A. A. LOCKE      2,559,444

EGG COOKER

Filed Nov. 23, 1945      3 Sheets-Sheet 3

INVENTOR
ARTHUR A. LOCKE
BY Raymond H. Fernes
ATTORNEY

Patented July 3, 1951

2,559,444

UNITED STATES PATENT OFFICE 2,559,444

EGG COOKER

Arthur A. Locke, Detroit, Mich.

Application November 23, 1945, Serial No. 630,187

12 Claims. (Cl. 99—327)

This invention relates to an egg cooker and, in particular, it relates to automatic means for cooking eggs electrically by the direct application of heat.

In cooking eggs it has been the general practice to immerse the egg in hot water and to allow the egg to remain therein for such a period of time which will produce either a soft boiled or a hard boiled egg. I have found that it is not essential to use water as a medium for cooking eggs, and that eggs may be cooked effectively and efficiently by the direct application of heat. With this principle in mind, I have provided an automatic device into which one or more eggs may be positioned and cooked by electrical heating elements in combination with mechanism for timing the heating operation and for ejecting the egg upon completion of the cooking cycle. More particularly, the invention comprises a cup-shaped member adapted to be heated by electrical resistance wires. An egg is placed into this cup-shaped member and a timing mechanism is operated which pivotally controls movement of the cup member to a cooking position and to an ejecting position whereat the egg is dropped from the cup member into a position where it may be readily removed manually.

Among the objects of my invention are to provide automatic means for cooking eggs; to provide means for cooking eggs in the shell without the use of water; to provide means for cooking an egg which will automatically remove the egg from the device upon completion of its cooking cycle; to provide means for cooking eggs which will permit the use of a simple and compact device of attractive appearance, and being readily adapted for use on a breakfast table; to provide means for cooking eggs which can be used repeatedly in successive operations without impairment or without requiring special attention to the device; and, to provide an egg cooker which will operate quickly, efficiently and economically for the purpose stated.

These and other objects and advantages will appear more fully in the following detailed description when considered in connection with the accompanying drawings, in which.

Figure 1:
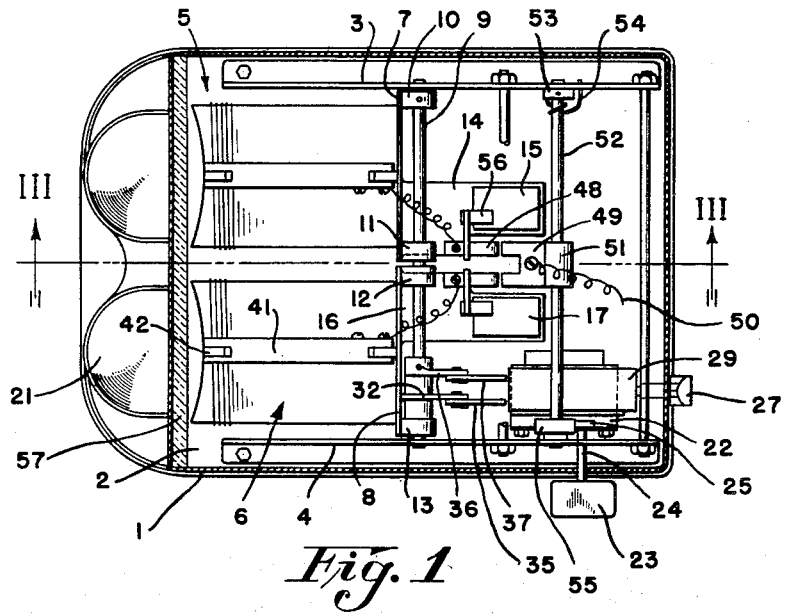
Figure 1 is a plan view, partly in section, of an egg cooker forming an embodiment of my invention.
Figure 2:
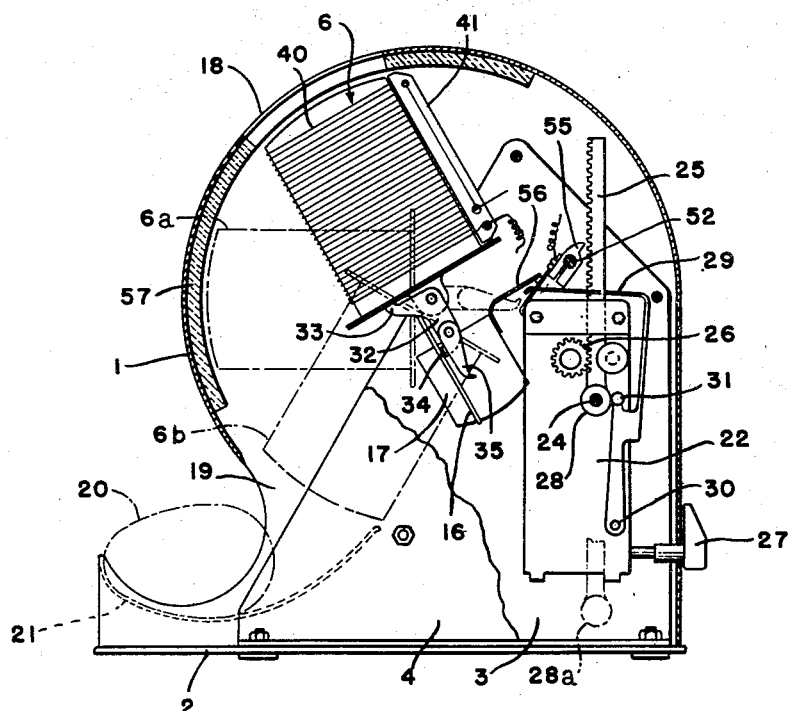
Figure 2 is a side elevational view thereof, partly in section.

With reference to the drawings and in particular to Figures 1 and 2, I show an embodiment of my invention in the form of an egg cooker in which two eggs may be cooked simultaneously. With a device as I have shown, one egg at a time may be cooked and, accordingly, only that portion of the egg cooker will be functioning during the cooking cycle. While I have shown a device which will permit the cooking of two eggs simultaneously, it is to be understood that the device may be constructed to cook one egg at a time, or it may be arranged for multiple operation in which any reasonable number of eggs may be cooked simultaneously.

Essentially, the cooker is completely encased in an outer metal shell or covering 1. In accordance with conventional practice this covering may be chrome plated so as to enhance its appearance for table use, as an appliance on the order of toasters, and the like. Within the covering 1 is a base plate 2 and side frames 3 and 4. The base plate 2 and side members 3 and 4 constitute the principal structural frame work which supports the mechanism required in the device. A pair of cup members 5 and 6 each having enclosed end portions 7 and 8, respectively, are pivotally attached to a shaft 9 supported by the side frames 3 and 4. Secured to the end portion 7 are brackets 10 and 11 which engage with the shaft 9. Also engageable with the shaft 9 are brackets 12 and 13 secured to the end portion 8. An arm 14 projecting from the end portion 7 supports a counterweight 15. In a similar manner, an arm 16 extending from the end portion 8 supports a counterweight 17. By an arrangement of this kind, the counterweights function to position the cups, as shown in Figure 2, in axial alignment with an aperture 18 for each cup in the outer covering 1 through which an egg may be inserted into a cup. The weight of the egg is sufficient to unbalance the counterweight so that the cups will assume a horizontal position 6—a and ejecting position 6—b, as shown in Figure 2. When the cup reaches the position 6—b, as hereinafter described, it becomes aligned with an opening 19 in the outer cover 1 at which time an egg 20 drops out of the cup and into a curved receptacle 21 adapted to receive and retain the egg until it is manually removed therefrom.

Forming a part of the mechanism is a clock or spring operated motor 22. This motor is of conventional type which utilizes a main spring, a gearing system and a balance wheel (not shown). The clock-works 22 is wound by a downward pressure on a hand operated lever 23 projecting outside of the cover 1. This lever 23, through a rod 24, engages with a rack 25 meshing with a gear 26. The clock-works 22 is attached to the side frame 4. Also conventionally associated with a clock-works of this type is a manually adjustable indicator 27 for controlling the speed of the clock-works. As adapted for the present purpose this indicator 27 functions to control the clock-works to operate at a speed which will determine the cooking cycle from a range of from approximately two to six minutes. To reset the clock-works the hand operated lever 23 is depressed downwardly carrying the rack 25 from the position shown in Figure 2 to a vertically lower position. In this operation, a cam 28 forming a lower portion of the rack 25 is moved into the lower position indicated by 28—a. The only outwardly operated mechanism controlled by the clock-works 22 is a trip arm 29 pivotally mounted to the clock-works at 30 and actuated by the cam 28 upon contact with the cam roller 31.

When, for example, an egg is placed into the cup member 6, the cup member immediately pivots into the horizontal position shown by 6—a. This is due to the weight of the egg being in excess of the counterweight 17. Loosely mounted on the shaft 9 is a bracket 32 including a foot 33 and a stop 34. An arm 35 is pivotally attached to the bracket 32 and is limited in its downward movement by means of the stop 34. Similarly, the foot 33 limits the downward swinging movement of the bracket 32. When the cup member 6 reaches the horizontal position, the arm 35 engages with the trip arm 29 which maintains the cup member in the horizontal position 6—a until subsequently released by the trip arm 29. When the rack 25, through the operation of the clock-works 22, reaches its upper position, as shown in Figure 2, the cam 28 engages the cam roller 31 causing the trip arm 29 to move out of engagement with the arm 35. The weight of the egg, therefore, being greater than the counterweight 17 causes the cup member 6 to move into the position 6—b which is such an inverted position that the egg 20 drops out by gravity onto the inclined chute 21. Thereafter, the counterweight is sufficient to move the cup member 6 back to its original position. Because the arm 35 is pivoted to the bracket 32, the arm will not be retained by the trip arm 29 in the event it lies in the path of the arm 35.

The cup 5 functions in a substantially similar manner. However, in order to permit it to operate independently, a few different structural changes may be noted. The bracket 10 attached to the end portion 7 is pinned to the shaft 9 so that the shaft moves with the movement of the cup member 5. This differs from the cup member 6 which is permitted to swing freely on the shaft 9. To maintain rigidity between a bracket 36 and the cup member 5, the bracket is pinned to the shaft 9. An arm 37 is pivoted to the bracket 36 and is similar to the arm 35 both in structure and in its functional relationship with the trip arm 29.

As thus far described the mechanical functioning of the apparatus has been shown. The electrical operation functions somewhat independently of the mechanical operation above described, and is treated separately herein.

The cup shaped members include a thin cylindrical metal wall 38 (Figures 3 and 4) on which is wrapped a thin layer of an electrically insulating material 39, such as mica or asbestos. Over this insulating material is wrapped a number of convolutions of electrical resistance wire 40. Along the length of the cup member and on the outside thereof is an electrically insulating bar 41 held in place by bent metal clips 42 attached to the cylindrical wall 38. The bar 41 serves as a base for the terminals 43 and 44 to which the ends of the resistance wires 40 are attached.

Within the metal wall 38 and at the lowermost portion thereof, are a plurality of ribs 45 adapted to serve as supporting members onto which the egg 20 may be supported in spaced relation from the wall 38. The ribs 45 also serve as a support upon which the egg is readily slidable.

A conductor wire 46 connecting with one end of the resistance wire 40 may lead directly to a source of electrical energy. The other end of the resistance wire 40 connects with a conductor 47 which connects to a brush member 48 attached through an insulating block 74 to the bracket 14. When the cup members are located in a horizontal position the brush 48 normally engages with a contact 49 extending to a source of electrical energy through the conductor wire 50 attached to the contact 49. When engagement is made between the brush 48 and the contact 49 the resistance wire 40 is energized to the extent that it provides sufficient heat to cook an egg. The contact 49 is secured to a bracket 51 formed of electrically insulating material and the bracket is clamped to a shaft rotatably supported by side frame members 3 and 4. A collar 53 (Figure 1) restricts axial movement of the shaft 52 and a spiral spring 54 attached to the collar 53 and to the side frame 3 maintains the contact 49 normally in engagement with the brush 48. Similar brushes and contacts are associated with the cup member 6 and, therefore, need no repeated description.

I have found it desirable to initially heat the cup members rapidly by means of the resistance wires 40. In so doing, it sometimes occurs that more heat is provided than is necessary during the remaining cooking cycle. I therefore provide a novel arrangement for intermittently cutting off the current leading to the resistance wires. This means comprises a dog 55 (Figure 2) clamped to the shaft 52 in such a position that the dog is engageable with the rack 25 after the rack moves into such an elevated position that it reaches the dog 55. As a result of the engagement of the dog 55 with the teeth of the rack 25 a reciprocating movement of the shaft 52 occurs. Since the contact 49 is attached to the shaft 52 an intermittent engagement of the contact 49 with the brush 48 takes place. As a result of this condition the current remains continuously to energize the resistance wires 40 until the rack 25 reaches the dog 55, at which time the current is intermittently on and off so that a substantial reduction in the heating of the cup member takes place.

To reset the timer or clock-works 22, the rack 25 is manually moved through the hand lever 23 to a lower position. In order to avoid the possibility of the dog 55 engaging the teeth of the rack 25 to prevent resetting of the clock-works 22 I provide an arm 56 attached to each counterweight 15 and 17 so that when the cup members 5 and 6 return to their inactive normal position the arm 56 engages with the contact member 49 so as to move the shaft 52 and maintain the dog out of engagement with the rack 25, thus permitting resetting of the clockworks 22. The end of the arm 56 which engages the contact 49 includes an insulating tip to prevent electrically grounding the contact 49 with the arm 56. The spring 54 is of such tension that it requires both of the cup members 5 and 6 to be located in their normal inactive position in order to cause movement of the dog 55 out of engagement with the teeth of the rack 25.

To complete the structure, a layer of insulating material 57 is attached to and located inside the cover 1 adjacent to the operating range of the cup members 5 and 6. This heat insulating material prevents the outer cover 1 from becoming excessively hot and at the same time forms a cover over the end of the cup members during the heating cycle so that heat is retained within the cup members.

Figure 5:
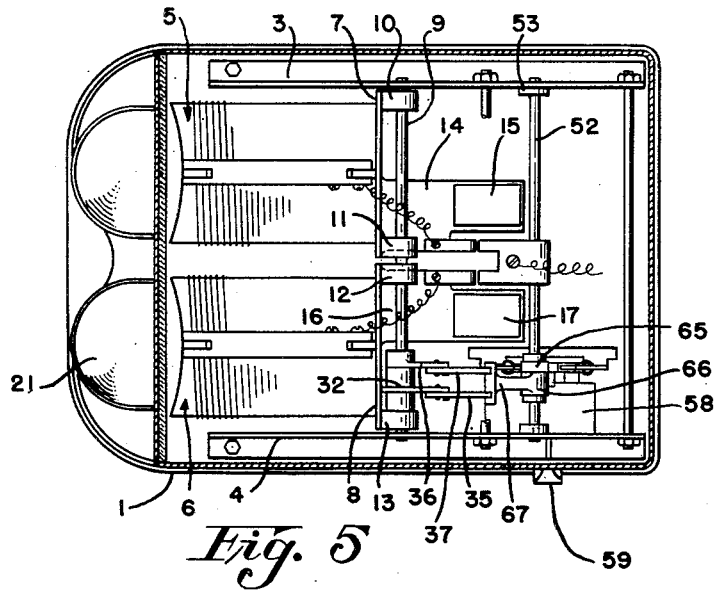
Figure 5 is a plan view, partly in section, of a modified form of egg cooker.
Figure 6:
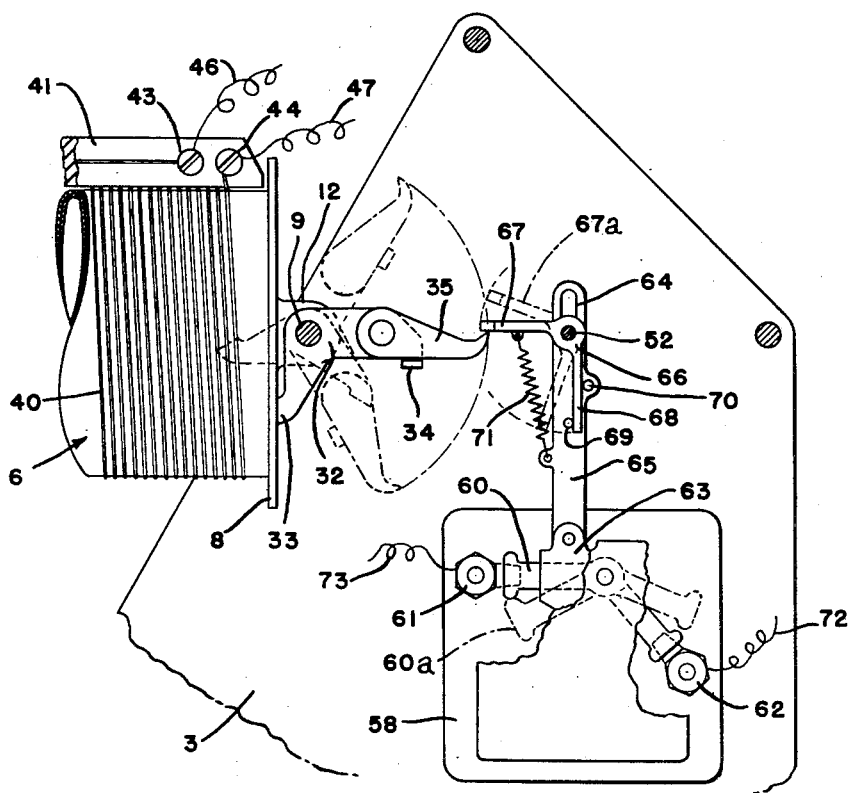
Figure 6 is a side elevational view, partly in section, of a portion of the modification shown in Figure 5.

With reference to Figures 5 and 6, I show a modification of the invention, which modification is limited primarily to the timing or clock-works combination with the remaining portion of the egg cooker. Since the principal portion of the mechanism is identical to the embodiment first described, it may be assumed that all of the reference characters identify similar parts because of their similar adaptation and function.

In the modification, a timing device or clockworks 58 is attached to the side frame 4. This clock-works is of conventional type involving a spring, gearing mechanism and balance wheel for determining the proper time interval. To set the timing device in operation a hand operated indicator knob 59 is moved in alignment with a marking on the side of the cover 1 indicating the proper time interval. This may be from two to six minutes, as desired. This timing mechanism 58 includes an electrical switch contact arm 60 which is adapted to make an electrical contact through the terminals 61 and 62. A turning movement of the hand operated knob 59 causes contact to be made between the contact terminals 61 and 62. At the end of the chosen time interval the contact arm 60 moves into the position 60—a, thus breaking the contact and cutting off the current leading to the resistance wires 40.

Figure 3:
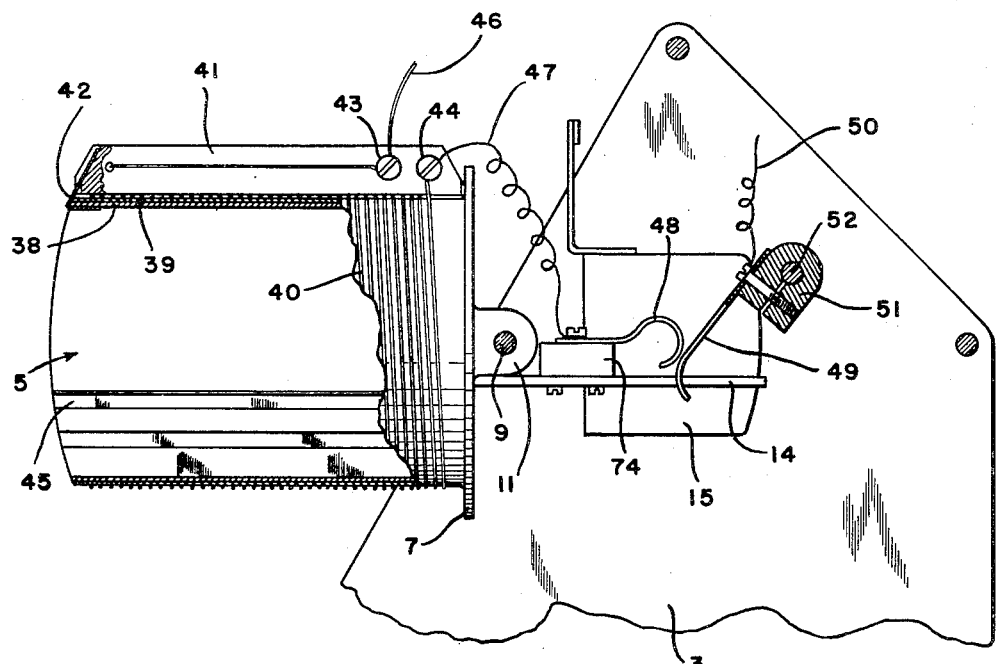
Figure 3 is a detail view of the egg cooking cup and associated mechanism, taken along lines III—III of Figure 1.
Figure 4:
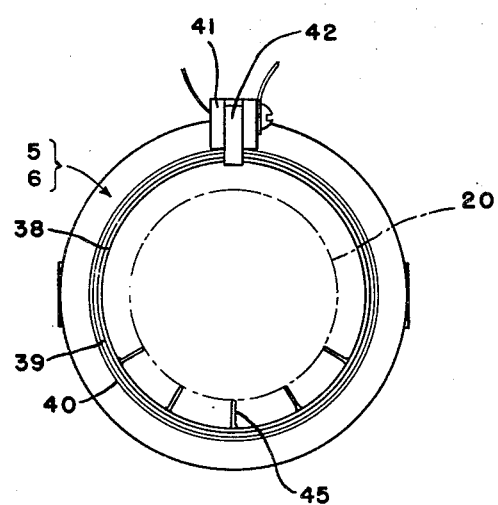
Figure 4 is a front elevational view of the egg cooker cup.

An insulating bracket 63 is attached to the contact arm 60 and an arm 65 is pivotally attached thereto. This arm extends vertically and is provided with a slot 64 through which the shaft 52 extends in supported relation with the side frames 3 and 4. Thus, the arm 5 is adapted to a vertical movement as determined by the position of the contact arm 60. Pivotally attached to the shaft 52 is a latch member 66 including a horizontal arm and a vertical arm 67 and 68, respectively. The horizontal arm 67 functions to engage the arm 35 for maintaining the cups 5 and 6 in a horizontal position. When the contact arm 60 becomes disengaged with its associated terminal and moves into the position 60—a, the arm 65 moves downwardly so as to disengage the pin 69 from the end of the vertical arm 68, thus allowing the horizontal arm 67 to move into position 67—a to release its engagement with the arm 35. When this occurs, the cup members are free to swing about the shaft 9 for ejecting the egg. A pin 70 projecting from the arm 65 limits the backward movement of the vertical arm 68 and a spring 71 maintains the vertical arm 68 in a normal position in contacting with the stop pin 70. To complete the electrical connections, the conductor wires 72 and 46 lead directly to a source of electrical energy whereas the wire 73 leads to the contact 49 (Figure 3). By this arrangement, the cycle of operation functions in substantially the same manner as that described in connection with the principal embodiment of the invention heretofore described.

As thus shown and described, it is believed apparent that I have provided a novel arrangement for cooking eggs in which, by a simple manual setting of the device and insertion of one or more eggs into cup members, a completely automatic functional operation takes place whereby the eggs are cooked in accordance with a predetermined time interval after which they are automatically ejected.

While I have shown a preferred embodiment of my invention, it is to be understood that it is susceptible of those modifications which appear obviously within the spirit of the invention and as appearing within the scope of the appended claims.

Having thus described my invention, what I claim and desire to protect by Letters Patent is:

1. A device in the form of a portable appliance for cooking eggs comprising, a substantially cylindrical open end receptacle for retaining an egg and being of a size slightly larger than the diameter and length of the egg, pivotal means for supporting the receptacle and about which the receptacle is invertible a counter weight for normally maintaining the receptacle in a position with its open end facing upward, said counter weight being of a weight less than the weight of the egg deposited within the receptacle whereby the receptacle is moved about its pivot by the weight of the egg, an arm extending from the receptacle, a latch for engagement with the arm for retaining the receptacle in substantially a horizontal position, and timing means for releasing the latch from the arm, whereby the weight of the egg inverts the receptacle for discharging the egg.

2. A device in the form of a portable appliance for cooking eggs comprising, a substantially cylindrical open end receptacle for retaining an egg and being of a size slightly larger than the diameter and length of the egg, an electrical heating element associated with the receptacle, pivotal means for supporting the receptacle, a counter weight for normally maintaining the receptacle in a position with its open end facing upward, said counter weight being of an effective weight less than the weight of the egg deposited within the receptacle whereby the receptacle is moved about its pivot by the weight of the egg, an arm extending from the receptacle, a latch for engagement with the arm for retaining the receptacle in substantially a horizontal position, electrical contacts engageable upon movement of the receptable into a horizontal position for energizing said heating element, and timing means for releasing the latch from the arm, whereby the weight of the egg inverts the receptacle for discharging the egg.

3. A device in the form of a portable appliance for cooking eggs comprising, a support, a substantially cylindrical receptacle having an open end for receiving and retaining an egg and being of a size slightly larger than the diameter and length of the egg, pivotal means connecting the receptacle with the support, an electrical heating element associated with the receptacle for heating the egg within the receptacle, means for maintaining the receptacle in a substantially horizontal position, and means for releasing the pivotally supported receptacle from its horizontal position, whereby the weight of the egg inverts the receptacle for discharging the egg.

4. A device in the form of a portable appliance for cooking eggs comprising, a support, a substantially cylindrical receptacle having an open end for receiving and retaining an egg and being of a size slightly larger than the diameter and length of the egg, pivotal means connecting the receptacle with the support, means for swinging the receptacle about its pivoted support to maintain its open end normally facing upward, an electrical heating element associated with the receptacle for heating the egg within the receptacle, said means for swinging the receptacle being over balanced upon depositing an egg therein, means for maintaining the receptacle in a substantially horizontal position, and means for releasing the pivotally supported receptacle from its horizontal position, whereby the weight of the egg inverts the receptacle for discharging the egg.

5. A device in the form of a portable appliance for cooking eggs comprising, a support, a substantially cylindrical receptacle having an open end for receiving and retaining an egg and being of a size slightly larger than the diameter and length of the egg, pivotal means connecting the receptacle with the support, means for swinging the receptacle about its pivoted support to maintain its open end normally facing upward, an electrical heating element associated with the receptacle for heating the egg within the receptacle, said means for swinging the receptacle being over balanced upon depositing an egg therein, means for maintaining the receptacle in a substantially horizontal position, electrical contacts engageable upon movement of the receptacle into a horizontal position for energizing said heating element, and means for releasing the pivotally supported receptacle from its horizontal position, whereby the weight of the egg inverts the receptacle for discharging the egg.

6. A device in the form of a portable appliance for cooking eggs comprising, a support, a substantially cylindrical receptacle having an open end for receiving and retaining an egg and being of a size slightly larger than the diameter and length of the egg, pivotal means connecting the receptacle with the support, means for swinging the receptacle about its pivoted support to maintain its open end normally facing upward, an electrical heating element associated with the receptacle for heating the egg within the receptacle, said means for swinging the receptacle being over balanced upon depositing an egg therein, means for maintaining the receptacle in a substantially horizontal position, electrical contacts engageable upon movement of the receptacle into a horizontal position for energizing said heating element, means for intermittently making and breaking the electrical contact, and means for releasing the pivotally supported receptacle from its horizontal position, whereby the weight of the egg inverts the receptacle for discharging the egg.

7. A device in the form of a portable appliance for cooking eggs comprising, a support, a substantially cylindrical receptacle having an open end for receiving and retaining an egg and being of a size slightly larger than the diameter and length of the egg, pivotal means connecting the receptacle with the support, means for swinging the receptacle about its pivoted support to maintain its open end normally facing upward, an electrical heating element associated with the receptacle for heating the egg within the receptacle, said means for swinging the receptacle being over balanced upon depositing an egg therein, means for maintaining the receptacle in a substantially horizontal position, electrical contacts engageable upon movement of the receptacle into a horizontal position for energizing said heating element, timing means for maintaining the receptacle in its horizontal position for a predetermined interval, and means for releasing the pivotally supported receptacle from its horizontal position, whereby the weight of the egg inverts the receptacle for discharging the egg.

8. A device in the form of a portable appliance for cooking eggs comprising, a support, a substantially cylindrical receptacle having an open end for receiving and retaining an egg and being of a size slightly larger than the diameter and length of the egg, a pivotal means connecting the receptacle with the support, an electrical heating element associated with the receptacle for heating the egg within the receptacle, a counter weight for swinging the receptacle about its pivoted support to maintain its open end normally facing upward, said counter weight being over balanced upon depositing an egg within the receptacle, means for maintaining the receptacle in a substantially horizontal position, an electrical contact movable with the receptacle, a second contact in the path of movement of the first named contact through which the heating element is energized, and means for releasing the pivotally supported receptacle from its horizontal position, whereby the weight of the egg inverts the receptacle for discharging the egg.

9. A device in the form of a portable appliance for cooking eggs comprising, a support, a substantially cylindrical receptacle having an open end for receiving and retaining an egg and being of a size slightly larger than the diameter and length of the egg, pivotal means connecting the receptacle with the support, means for swinging the receptacle about its pivoted support to maintain its open end normally facing upward, an electrical heating element associated with the receptacle for heating the egg within the receptacle, said means for swinging the receptacle being over balanced upon depositing an egg therein, means for maintaining the receptacle in a substantially horizontal position, means for releasing the pivotally supported receptacle from its horizontal position, whereby the weight of the egg inverts the receptacle for discharging the egg, and means for returning the receptacle to its normal position.

10. A device in the form of a portable appliance for cooking eggs comprising, a support, a substantially cylindrical receptacle having an open end for receiving and retaining an egg and being of a size slightly larger than the diameter and length of the egg, pivotal means connecting the receptacle with the support, means for swinging the receptacle about its pivoted support to maintain its open end normally facing upward, said means for swinging the receptacle being over balanced upon depositing an egg therein, an arm extending from the receptacle, a latch for engagement with the arm for retaining the receptacle in substantially a horizontal position, and timing means for releasing the latch from the arm, whereby the weight of the egg inverts the receptacle for discharging the egg.

11. A device in the form of a portable appliance for cooking eggs comprising, a support, a substantially cylindrical receptacle having an open end for receiving and retaining an egg and being of a size slightly larger than the diameter and length of the egg, pivotal means connecting the receptacle with the support, means for swinging the receptacle about its pivoted support to maintain its open end normally facing upward, an electrical heating element associated with the receptacle for heating the egg within the receptacle, said means for swinging the receptacle being over balanced upon depositing an egg therein, electrical contacts engageable upon movement of the receptacle into a horizontal position for energizing said heating element, an arm extending from the receptacle, a latch for engagement with the arm for retaining the receptacle in substantially a horizontal position, and timing means for releasing the latch from the arm, whereby the weight of the egg inverts the receptacle for discharging the egg.

12. A device in the form of a portable appliance for cooking eggs comprising, a support, a substantially cylindrical receptacle having an open end for receiving and retaining an egg and being of a size slightly larger than the diameter and length of the egg, pivotal means connecting the receptacle with the support, means for swinging the receptacle about its pivoted support to maintain its open end normally facing upward, said means for swinging the receptacle being over balanced upon depositing an egg therein, an arm extending from the receptacle, a latch for engagement with the arm for retaining the receptacle in substantially a horizontal position, timing means for releasing the latch from the arm, whereby the weight of the egg inverts the receptacle for discharging the egg, means for returning the receptacle to its normal position, and pivotal means associated with the arm for permitting return movement of the arm passed said latch.

ARTHUR A. LOCKE.

REFERENCES CITED

The following references are of record in the file of this patent:

UNITED STATES PATENTS

| Number | Name | Date |
|---|---|---|
| Re. 20,570 | Rushway | Dec. 7, 1937 |
| 816,072 | Chesbrough | Mar. 27, 1906 |
| 874,278 | Adams | Dec. 17, 1907 |
| 1,118,471 | Carlton | Nov. 24, 1914 |
| 1,228,956 | Noonan | June 5, 1917 |
| 1,433,501 | Donges | Oct. 24, 1922 |
| 1,460,140 | Penso | June 26, 1923 |
| 1,543,069 | Ellis | June 23, 1925 |
| 1,550,949 | Coleman | Aug. 25, 1925 |
| 1,769,893 | Uhl | July 1, 1930 |
| 1,901,603 | Juengst et al. | Mar. 14, 1933 |
| 1,931,345 | Fitzgerald | Oct. 17, 1933 |
| 2,014,089 | Sabini | Sept. 10, 1935 |
| 2,038,361 | Hawes | Apr. 21, 1936 |
| 2,270,327 | Mills | Jan. 20, 1942 |
| 2,364,175 | Turner | Dec. 5, 1944 |
| 2,414,081 | Barclay | Jan. 14, 1947 |
| 2,459,933 | Gomersall | Jan. 25, 1949 |